United States Patent [19]

Genrikh et al.

[11] 4,085,338
[45] Apr. 18, 1978

[54] HIGH-VOLTAGE NETWORK FOR AREAS WITH HIGH RATE OF ICING

[76] Inventors: Georgy Andreevich Genrikh, ulitsa Chekistov 10, kv. 3; Leonid Alexeevich Nikonets, Khasansakya ulitsa 8, kv. 4; Natalia Georgievna Genrikh, ulitsa Chekistov 10, kv. 3, all of Lvov, U.S.S.R.

[21] Appl. No.: 659,795

[22] Filed: Feb. 20, 1976

[51] Int. Cl.² .............................................. H02B 1/00
[52] U.S. Cl. .................................... 307/147; 219/209
[58] Field of Search .............. 307/147, 11, 149; 219/209; 174/40 R; 333/95 R; 340/234; 343/704

[56] References Cited

U.S. PATENT DOCUMENTS

| | | | |
|---|---|---|---|
| 2,240,772 | 5/1941 | Hampe et al. | 307/147 |
| 2,870,311 | 1/1959 | Greensfield et al. | 174/40 R |

FOREIGN PATENT DOCUMENTS

| | | | |
|---|---|---|---|
| 279,736 | 11/1970 | U.S.S.R. | 307/147 |

Primary Examiner—Robert K. Schaefer
Assistant Examiner—Morris Ginsburg
Attorney, Agent, or Firm—Lackenbach, Lilling & Siegel

[57] ABSTRACT

A high-voltage network for areas with high rates of icing includes load current circuits including aerial electric power transmission lines and a transformer for melting of an ice coating, the primary winding of the transformer being connected in series with a load current circuit and the secondary winding of said transformer being connected to conductors of one of the aerial electric power transmission lines.

36 Claims, 25 Drawing Figures

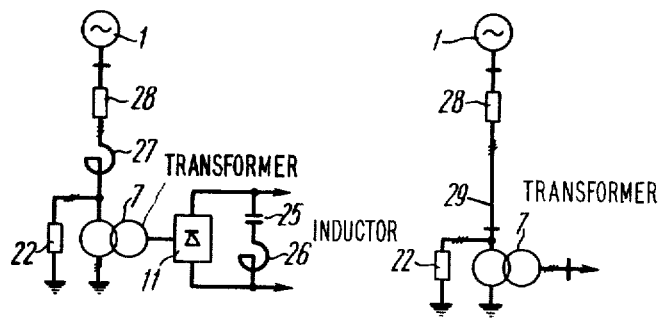
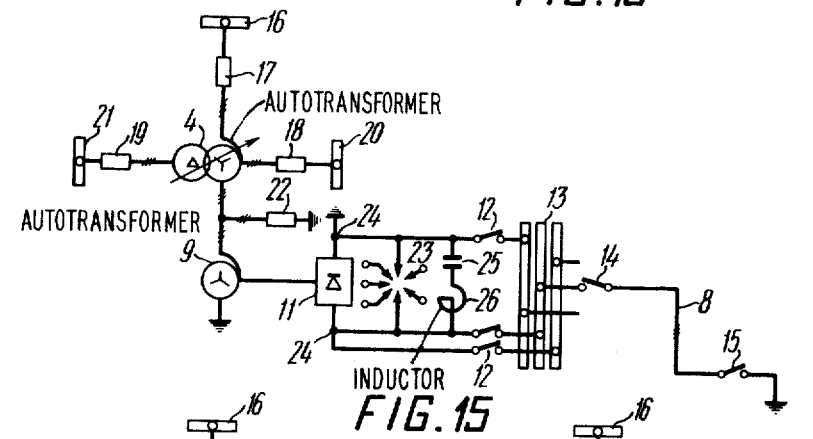
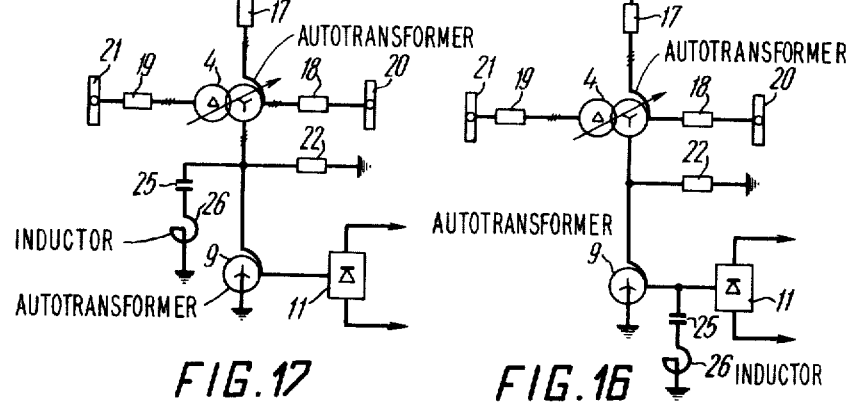

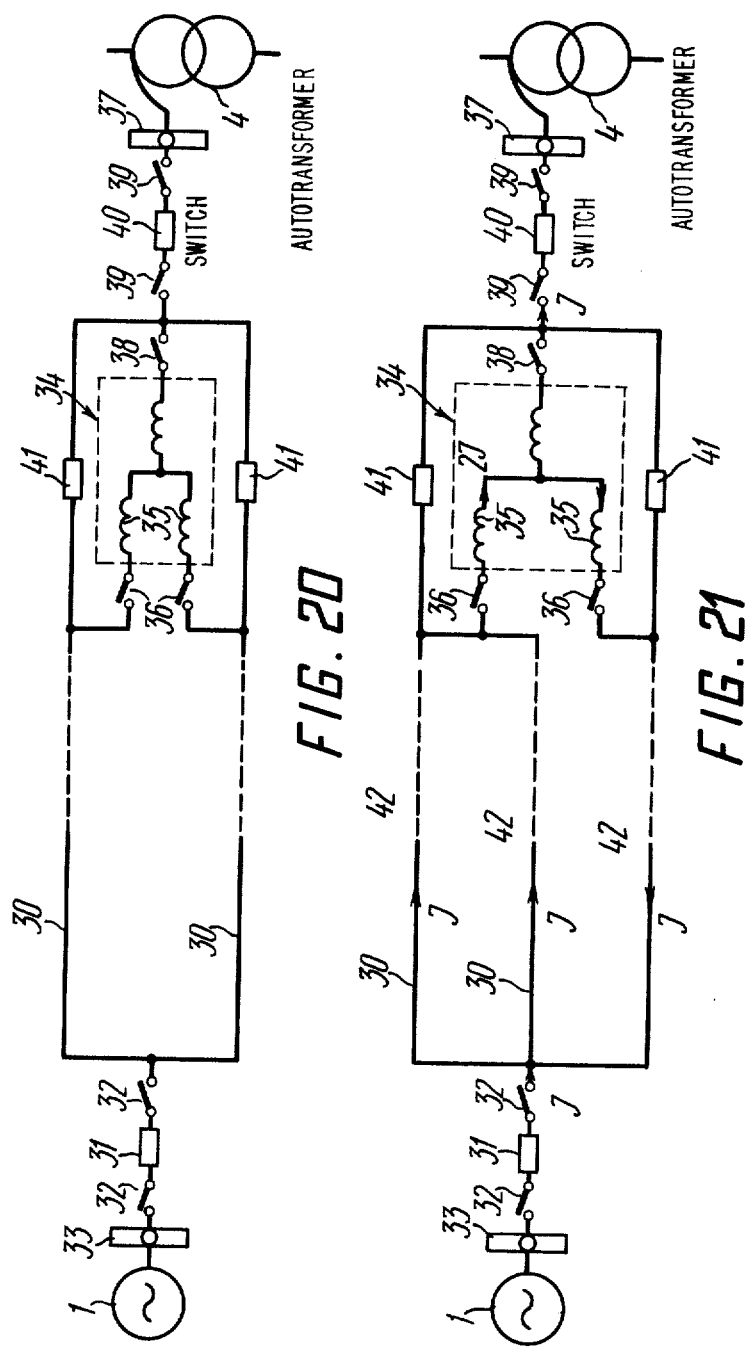

HIGH-VOLTAGE NETWORK FOR AREAS WITH HIGH RATE OF ICING

The present invention relates to electroenergetics, and more specifically to high-voltage networks for areas with high rates of icing.

Known in the art is a high-voltage network for areas with high rates of icing, the network comprising load current circuits, formed by generators, transformers or autotransformers, which are installed in substations, by aerial power transmission lines, complex loads, systems of collecting bars providing for connecting the elements, and at least one transformer or autotransformer for melting ice coatings on conductors and cables of power transmission lines of the high-voltage network.

The primary winding of the transformer or an autotransformer for melting of ice coating of the known high-voltage network, for areas with high rates of icing, is connected to high-voltage feed bars, the secondary winding of the transformer or autotransformer for melting of ice coating being connected to conductors or cables of the aerial power transmission line on which the ice coating should be melted. The process of melting is attained owing to heating of conductors or cables with electric current. Often with a view to reducing the installed capacity of the transformer or autotransformer for melting of ice coating in such high-voltage networks, the secondary winding of the transformer or autotransformer is connected to the aerial power transmission line via a high-voltage rectifier. In this case the conductors or cables of the aerial power transmission line are connected to direct current outlets of the high-voltage rectifier, which rectifier, as a rule, is of an unregulated type. All the known high-voltage lines for areas with high rates of icing are characterized by an invariable or step-variable level of voltage providing for melting of ice coatings on wires of aerial power transmission lines of high-voltage network. As a rule, the substations of a high-voltage network are provided with one transformer or autotransformer for melting of ice coatings. As for the characteristics of the aerial power transmission lines outcoming from a substation, namely the length of said lines and conductor cross-section dimensions, the characteristics vary. This being the case, the value of current required for melting ice coatings on conductors of aerial power transmission lines is ensured by assembling a special circuit for each of the lines. The make-up of the circuit is determined by the need for providing a circuit for melting ice coatings, the circuit being of a certain total resistance, said circuit providing for flow of electric current heating those conductors from which ice coatings must be removed. The value of the total resistance is determined proceeding from conditions of permissible overloading of the transformer or autotransformer for melting of ice coatings, and proceeding from permissible overheating of conductors.

The use of special circuits in each specific case requires much time for operational switchings needed for preparing the circuit, and, as a rule, requires much time for warm-up of conductors themselves, the time losses resulting from impossibility of controlling the value of voltage at which melting of ice coatings is carried out, the latter being the main disadvantage of the known in the art high-voltage networks.

Another disadvantage of such high-voltage networks is that emergency operating conditions of the high-voltage networks are accompanied by passage of overcurrents, hence while selecting the equipment for the high-voltage network this requirement must also be taken into account, resulting in complicity of the network.

It is an object of the invention to provide a high-voltage network for areas with high rates of icing providing for reducing time required for warming-up of the conductors of aerial power transmission lines, whereon the melting of ice coating is carried out, and providing for reducing emergency overcurrents in elements of the lines.

The above and other objects are achieved by a high-voltage network for areas with high rates of icing comprising load current circuits including a generator, a transformer or an autotransformer; aerial power transmission lines and complex loads, and at least one transformer or an autotransformer for melting of ice coatings, the secondary winding of said transformer being connected to conductors of one of the aerial power transmission lines, the primary winding of the transformer or autotransformer for melting of ice coatings is, according to the invention, connected in series with the load current circuit.

It is expedient in a high voltage network to connect the secondary winding of the transformer for melting ice coatings with the aerial power transmission line via a rectifier, a recurrent network formed by an inductor and a capacitor connected in series, being coupled to direct current outlets of said rectifier.

It is also expedient in a high-voltage network to connect the secondary winding of the autotransformer for melting of ice coatings to the aerial power transmission line via a rectifier, a recurrent network formed by an inductor and a capacitor which are connected in series, being connected to direct current outlets of said rectifier.

It is also expedient in a high voltage network to connect the secondary winding of the transformer for melting of ice coatings to the aerial power transmission line via a rectifier, and to connect a recurrent network formed by an inductor and a capacitor which are connected in series, in parallel with said secondary winding.

It is also expedient in a high-voltage network to connect the secondary winding of an autotransformer for melting of ice coatings to the aerial power transmission line via a rectifier and to connect a recurrent network formed by an inductor and a capacitor, which are connected in series, in parallel with said secondary winding.

It is also expedient in a high-voltage network to connect the secondary winding of the transformer for melting of ice coatings to the aerial power transmission line via a rectifier a recurrent network formed by an inductor and a capacitor, which are connected in series, being connected in parallel with the primary winding of the transformer for melting of ice coating.

It is also expedient in a high-voltage network to connecte the secondary winding of an autotransformer for melting of ice coatings to the aerial power transmission line via a rectifier, a recurrent network formed by an inductor and a capacitor which are connected in series, being connected in parallel with the primary winding of the autotransformer for melting of ice coating.

It is also expedient in a high-voltage network to connect the primary winding of a transformer for melting of ice coatings in series with the load current circuit between the outlets of the generator and the outlets of the low-voltage winding of a transformer.

It is also expedient in a high-voltage network to connect the primary winding of a transformer for melting of ice coatings in series with the load current circuit between the outlets of the generator and the outlets of the low-voltage winding of an autotransformer.

It is also expedient in a high-voltage network to connect the primary winding of a transformer for melting of ice coatings in series with the load current circuit between "earth" or "ground" and three neutral outlets of the high-voltage winding of a transformer.

It is also expedient in a high-voltage network to connect the primary winding of an autotransformer for melting of ice coatings in series with the load current circuit between "earth" or "ground" and three neutral outlets of the high-voltage winding of a transformer.

It is also expedient in a high-voltage network to connect the primary winding of a transformer for melting of ice coatings in series with the load current circuit between the high-voltage outlet of a transformer or an autotransformer and a phase of another aerial power transmission line.

It is also expedient in a high-voltage network to connect the primary winding of an autotransformer for melting of ice coatings in series with the load current circuit between the high-voltage outlet of a transformer of an autotransformer and a phase of another aerial power transmission line.

It is also expedient in a high-voltage network to connect the primary winding of a transformer for melting of ice coatings in series with the load current circuit between three neutral outlets of complex load and "earth" or "ground".

It is also expedient in a high-voltage network to connect the primary winding of an autotransformer for melting of ice coatings in series with the load current circuit between three neutral outlets of complex load and "earth" or "ground".

It is also expedient in a high-voltage network to connect the primary winding of a transformer for melting of ice coatings in series with a load current circuit between the complex load and outlets of the average voltage winding of an autotransformer.

It is also expedient in a high-voltage network to connect the primary winding of an autotransformer for melting of ice coatings in series with the load current circuit between a complex load and outlets of the average voltage winding of an autotransformer.

It is also expedient in a high-voltage network, wherein the aerial power transmission line comprises two insulated groups of conductors, said groups of conductors being equipotential as per working voltages thereof and the secondary winding of a single-phase autotransformer for melting of ice coatings is split into two sections, to switch said sections of the secondary winding of an autotransformer for melting of ice coatings and also said two insulated groups of conductors into a circuit, said sections of the secondary winding being switched into said circuit accordantly.

It is also expedient in a high-voltage network, wherein the aerial power transmission line comprises an insulated group of conductors, including two conductors, and a conductor, which are equipotential as per working voltages thereof, and the secondary winding of a single-phase autotransformer is split into two sections, to switch said sections of the secondary winding of an autotransformer for melting of ice coatings and also said isolated group of conductors and said conductor into a circuit, said sections of the secondary winding being switched into said circuit accordantly.

It is also expedient in a high-voltage network, wherein the aerial power transmission line comprises three insulated conductors in phase, to connect each phase of the secondary winding of a three-phase transformer for melting of ice coatings in series with respective ones of the insulated conductors of a phase of the aerial power transmission line.

It is also expedient in a high-voltage network to connect two three-phase transformers for melting of ice coatings with the opposite ends of the aerial power transmission line, said line comprising four insulated conductors in phase, two different pairs of the insulated conductors of which are short-circuited from the opposite ends, the analogous phases of the secondary windings of both of the transformers for melting of ice coatings being connected to opposite pairs of the short-circuited insulated conductors, the two remaining phases of the transformers for melting of ice coatings to be connected to the two remaining insulated conductors.

It is also expedient in a high-voltage network, wherein the aerial power transmission line comprises two insulated groups of conductors being equipotential as per working voltages thereof, to switch into a circuit in series with the two insulated groups of conductors single-phase converters fed from the secondary winding of a transformer for melting of ice coatings, said single-phase converters being switched into said circuit accordantly.

The invention is further described in examples illustrating its various embodiments and in the accompanying drawings, in which.

Figure 12:
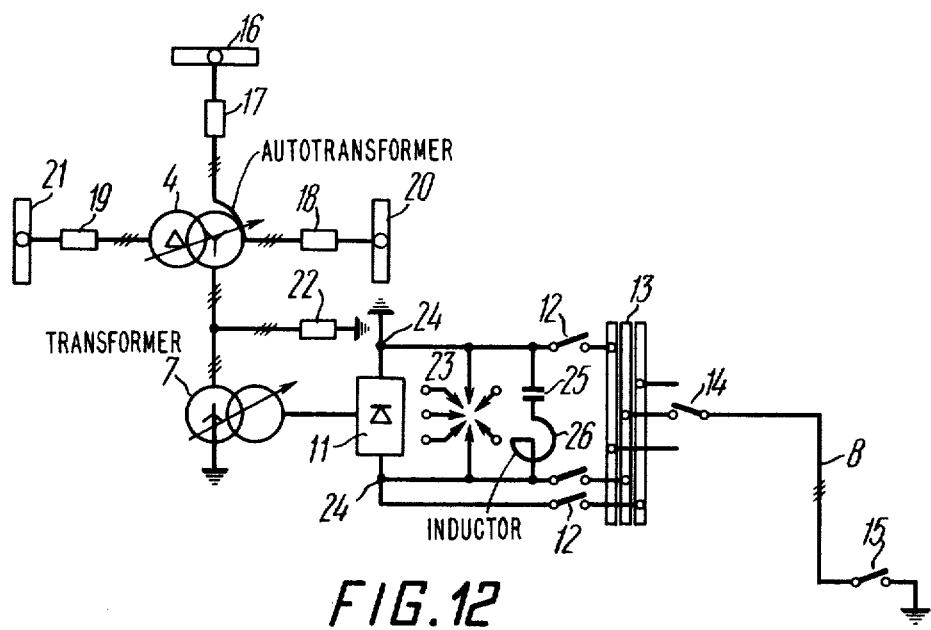

FIG. 12 shows a high-voltage network for areas with high rate of icing, wherein the primary winding of a transformer for melting of ice coating is switched into a load current circuit between three neutral outlets of an autotransformer and "earth," whereas the secondary winding of the transformer for melting of ice coating is connected to the aerial power transmission line via a rectifier, a circuit formed by an inductor and a capacitor connected in series, being coupled to direct current outlets of said rectifier, according to the invention.

Figure 13:
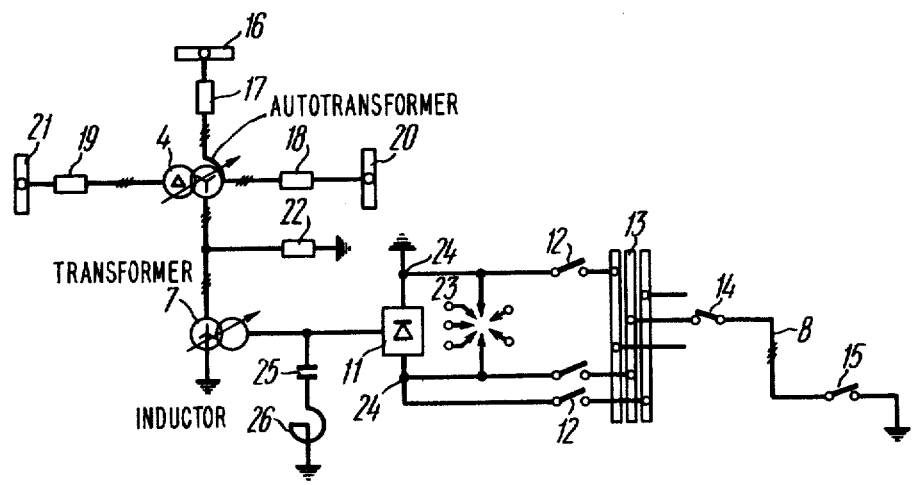

FIG. 13 shows a high-voltage network for areas with high rate of icing, wherein the primary winding of a transformer for melting of ice coating is switched into a load current circuit between three neutral outlets of an autotransformer and "earth," whereas the secondary winding of the transformer for melting of ice coating is connected to the aerial power transmission line via a rectifier, a recurrent circuit formed by an inductor and a capacitor connected in series, being coupled in parallel with said secondary winding, according to the invention.

Figure 14:
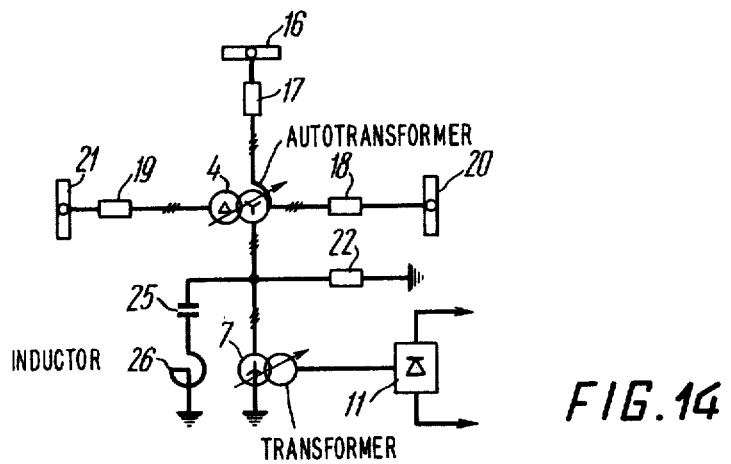

FIG. 14 shows a high-voltage network for areas with high rate of icing, wherein the primary winding of a transformer for melting of ice coating is inserted into a load current circuit between three neutral outlets of an autotransformer and "earth," whereas the secondary winding of the transformer for melting of ice coating is connected to an aerial power transmission line via a rectifier, a recurrent circuit formed by an inductor and a capacitor connected in series, being coupled in parallel with the primary winding of the transformer for melting of ice coating, according to the invention.

FIG. 15 shows a high-voltage network for areas with high rate of icing, wherein the primary winding of an autotransformer for melting of ice coating is inserted into a load current circuit between three neutral outlets of an autotransformer and "earth," whereas the secondary winding of the autotransformer for melting of ice coating is connected to an aerial power transmission line via a rectifier, a recurrent circuit formed by an inductor and a capacitor connected in series, being coupled to the direct current outlets of said rectifier, according to the invention.

Figure 22:
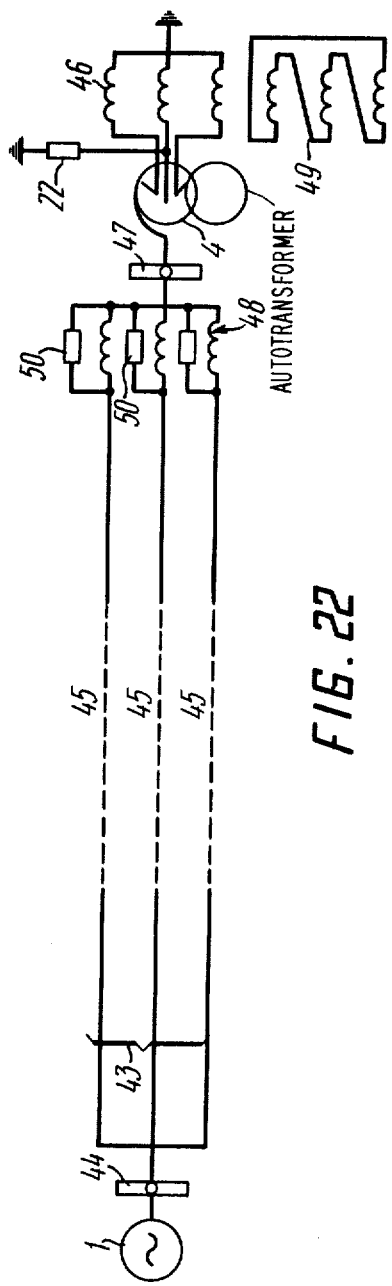
Figure 23:
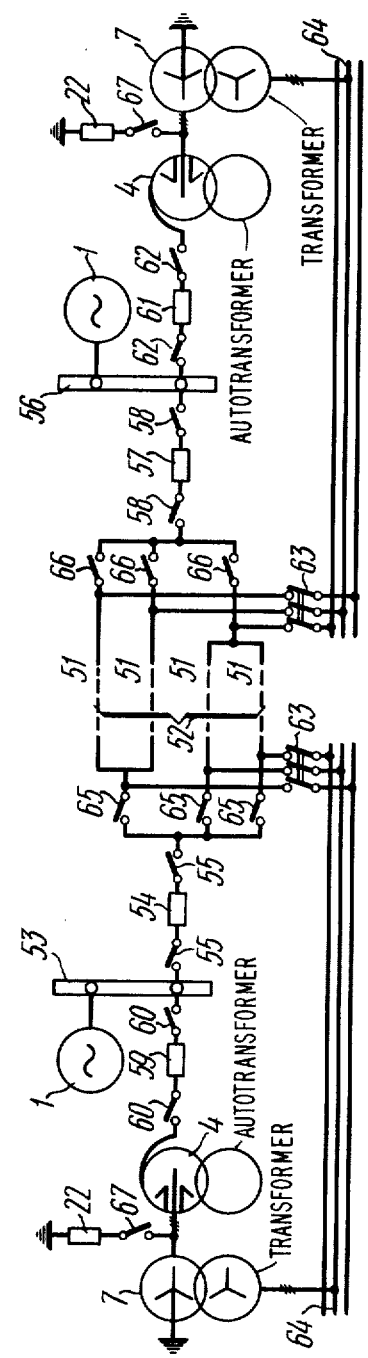
Figure 24:
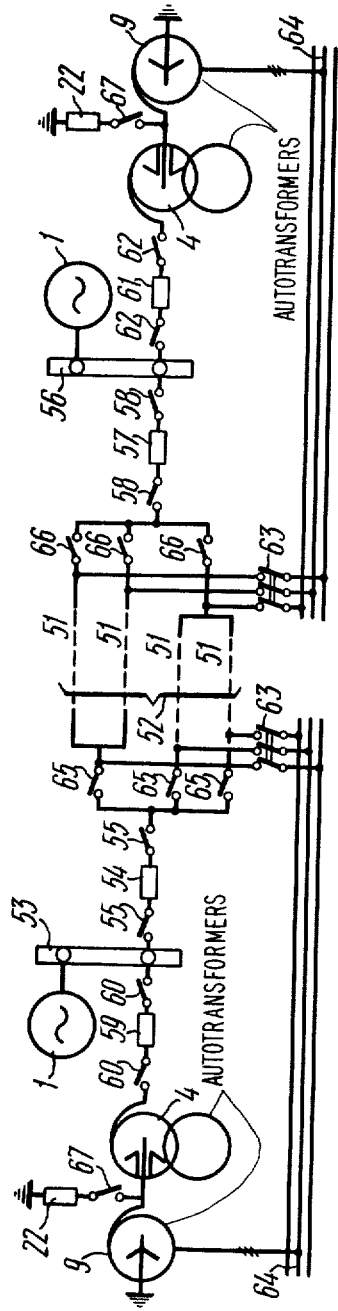
Figure 25:
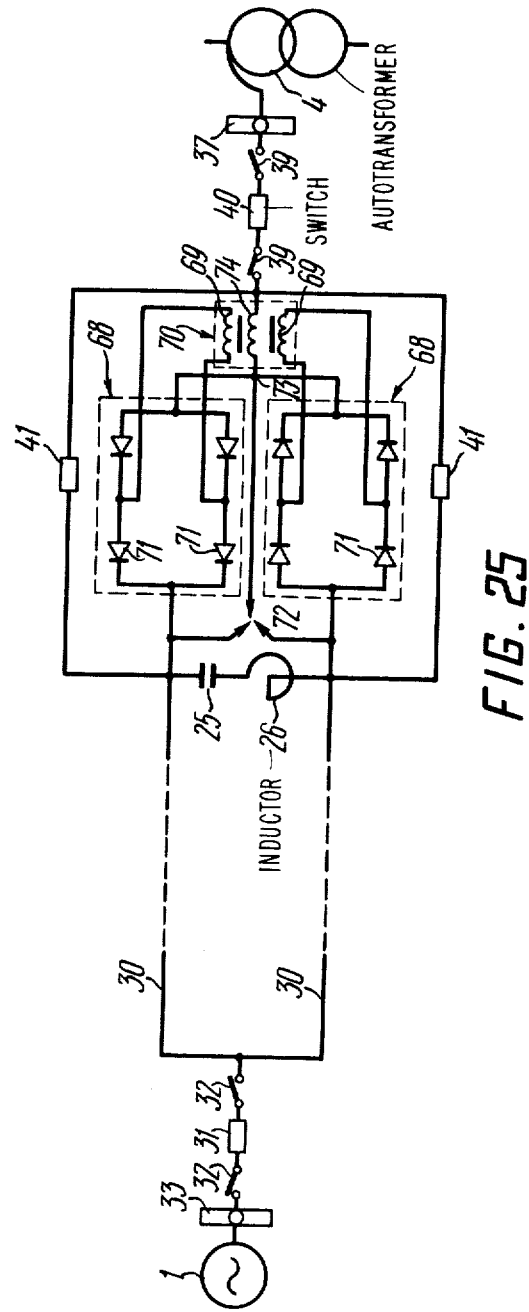

FIG. 16 shows a high-voltage network for areas with high rate of icing, wherein the primary winding of an autotransformer for melting of ice coating is inserted into a load current circuit between three neutral outlets of an autotransformer and "earth," whereas the secondary winding of the autotransformer for melting of ice coating is connected to an aerial power transmission line via a rectifier, a recurrent circuit formed by an inductor and a capacitor connected in series, being coupled in parallel with said secondary winding, according to the invention;

FIG. 17 shows a high-voltage network for areas with high rate of icing, wherein the primary winding of an autotransformer for melting of ice coating is inserted into a load current circuit between three neutral outlets of the autotransformer and "earth," whereas the secondary winding of the autotransformer for melting of ice coating is connected to an aerial power transmission line via a rectifier, a recurrent circuit formed by an inductor and a capacitor connected in series being coupled in parallel with the primary winding of the autotransformer for melting of ice coating, according to the invention;

FIG. 18 shows a high-voltage network for areas with high rate of icing, wherein high-voltage transmission shunting reactors are used as a complex load;

FIG. 19 shows a high-voltage network for areas with high rate of icing, wherein conductors of an aerial power transmission line are used as a complex load;

FIG. 20 shows a high-voltage network for areas with high rate of icing, wherein a split secondary winding of an autotransformer for melting of ice coating is inserted into a circuit with two insulated groups of conductors, according to the invention;

FIG. 21 shows a high-voltage network for areas with high rate of icing, wherein a split secondary winding of an autotransformer for melting of ice coating in inserted into a circuit with an insulated group of conductors and a conductor, according to the invention;

FIG. 22 shows a high-voltage network for areas with high rate of icing, wherein the aerial power transmission line comprises three insulated conductors in phase and each phase of the secondary winding of the transformer for melting of ice coating is connected respectively in series with one of the insulated conductors of a phase of the aerial power transmission line, according to the invention;

FIG. 23 shows a high-voltage network for areas with high rate of icing, wherein transformers for melting of ice coating are connected to the aerial power transmission line from the opposite ends thereof, said line comprising four insulated conductors in phase, according to the invention;

FIG. 24 shows a high-voltage network for areas with high rate of icing, wherein autotransformers for melting of ice coating are connected to the opposite ends of the aerial power transmission line, said line comprising four insulated conductors in phase, according to the invention;

FIG. 25 shows a high-voltage network for areas with high rate of icing, wherein one of the load current circuits the aerial power transmission line comprises two insulated groups of conductors, said conductors being equipotential as per working voltage thereof, single-phase converters fed from the secondary winding of the transformer for melting of ice coating, being accordantly connected with the circuit in series with said insulated groups of conductors, according to the invention.

Figure 1:
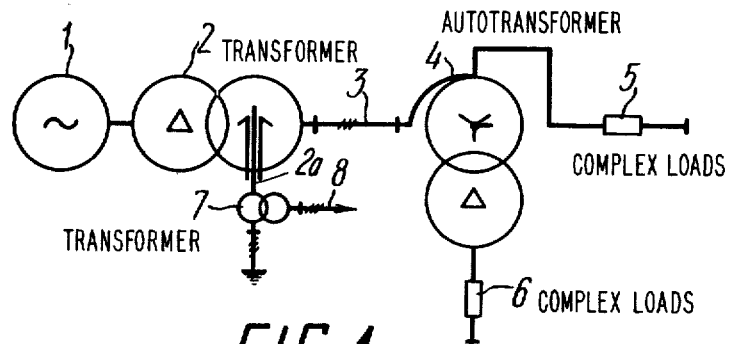
FIG. 1 shows a high-voltage network for areas with high rate of icing, comprising load current circuits and a transformer for melting of ice coating, the primary winding of said transformer being inserted between the neutral outlets 22 of the high-voltage winding of a transformer of the high-voltage network and "earth," according to the invention.

Referring now to FIG. 1 a high-voltage network for areas with high rate of icing is in the nature of two load current circuits and includes in series connection a power source, generator 1, a step-up transformer 2, an aerial electric power transmission line 3, a reducing autotransformer 4 and complex loads 5 and 6, fed from average-voltage and low-voltage windings of the autotransformer 4. The primary winding of a three-phase transformer 7 for melting of ice coating is connected in series with the load current circuit between three neutral outlets of the high-voltage winding of the transformer 2 of the high-voltage network and "earth." The secondary winding of the transformer 7 for melting of ice coating is connected to an aerial electric power transmission line 8, said line being short-circuited at the opposite end thereof.

A group of single-phase transformers may be used instead of the three-phase transformer 7 for melting of ice coating.

Figure 2:
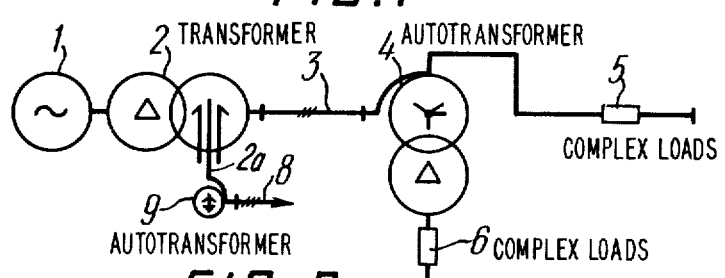
FIG. 2 shows a high-voltage network for areas with high rate of icing, wherein the primary winding of an autotransformer for melting of ice coating is inserted between neutral outlets of the high-voltage winding of a transformer of the high-voltage network and "earth," according to the invention.

FIG. 2 shows a high-voltage network for areas with high rate of icing identical to that of FIG. 1, wherein instead of the transformer 7 (FIG. 1) for melting of ice coating an autotransformer 9 (FIG. 2) is provided, said autotransformer 9 being inserted in a like manner.

Figure 3:
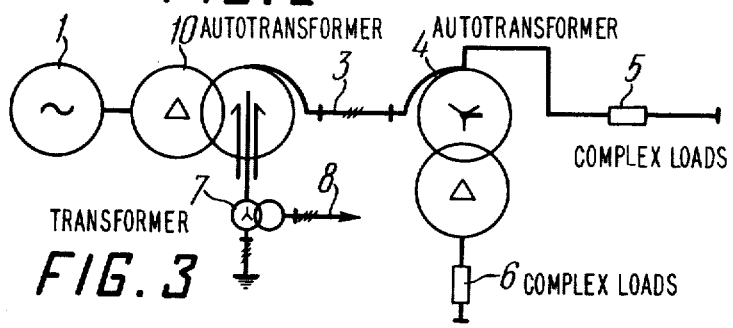
FIG. 3 shows a high-voltage network for areas with high rate of icing, wherein the primary winding of a transformer for melting of ice coating is inserted between the neutral outlets of an autotransformer of the high-voltage network and "earth," according to the invention.

FIG. 3 shows a high-voltage network for areas with high rate of icing similar to that of FIG. 1, wherein an autotransformer 10 (FIG. 3) is used instead of the transformer 2 (FIG. 1).

Figure 4:
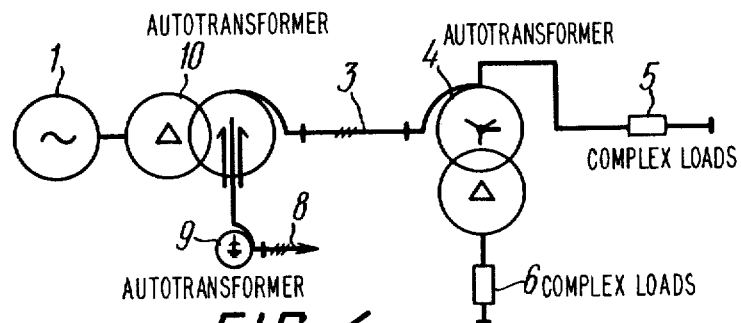
FIG. 4 shows a high-voltage network for areas with high rate of icing, wherein the primary winding of an autotransformer for melting of ice coating is inserted between neutral outlets of the average-voltage winding of an autotransformer of the high-voltage network and "earth," according to the invention.

FIG. 4 shows a high-voltage network for areas with high rate of icing similar to that of FIG. 1, wherein autotransformers 9 (FIG. 4) and 10 are used in place of the transformer 7 (FIG. 1) for melting of ice coating and the transformer 2.

Figure 5:
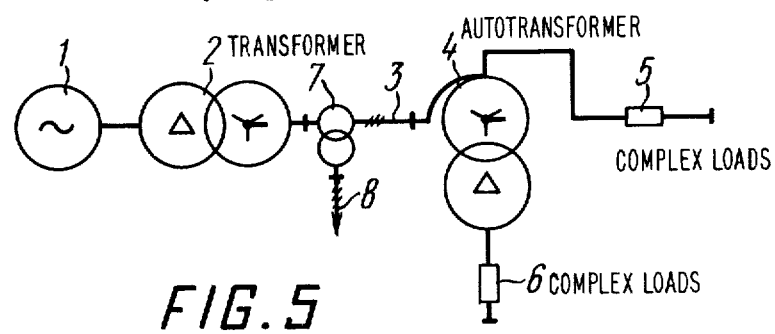
FIG. 5 shows a high-voltage network for areas with high rate of icing, wherein the primary winding of a transformer for melting of ice coating is inserted between an outlet of the high-voltage winding of a transformer and a phase of the aerial power transmission line, according to the invention.

In the high-voltage network for areas with high rate of icing the primary winding of the transformer 7 (FIG. 5) for melting of ice coating is inserted in series into the load current circuit between the high-voltage bushing of the transformer 2 and the phase of the electric power transmission line 3.

Figure 6:
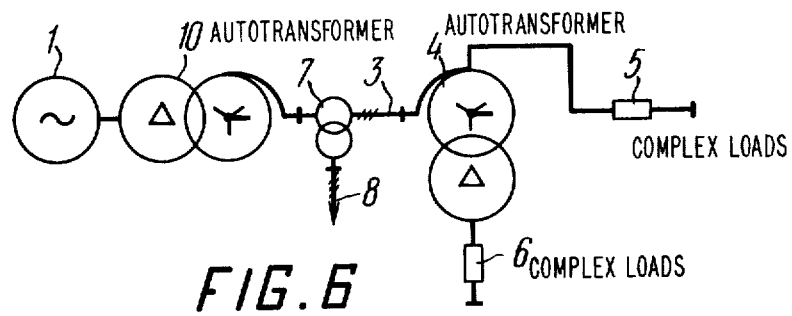
FIG. 6 shows a high-voltage network for areas with high rate of icing, wherein the primary winding of a transformer for melting of ice coating is inserted between an outlet of the high-voltage winding of an autotransformer and a phase of the aerial power transmission line, according to the invention.

The primary winding of the transformer 7 (FIG. 6) for melting of ice coating is similarly inserted in series with the load current circuit between the high-voltage bushing of the autotransformer 10 and the phase of the aerial electric power transmission line 3.

In the high-voltage network for areas with high rate of icing the primary winding of the autotransformer for melting of ice coating is connected similar to the above description in series with the load current circuit between the high-voltage bushing of the transformer and the phase of the aerial electric power transmission line or in series with the load current circuit between the high-voltage bushing of the autotransformer and the phase of the aerial electric power transmission line.

Figure 7:
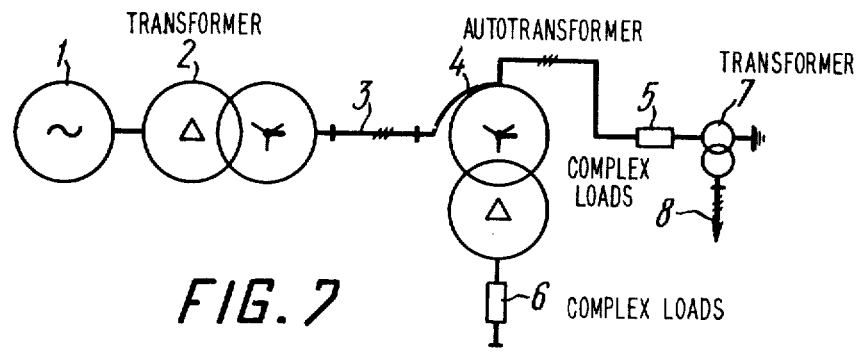
FIG. 7 shows a high-voltage network for areas with high rate of icing, wherein the primary winding of a transformer for melting of ice coating is inserted between three neutral outlets of the complex load and "earth," according to the invention.

FIG. 7 shows a high-voltage network for areas with high rate of icing similar to that of FIG. 1, wherein the primary winding of the transformer 7 for melting of ice coating is connected in series with the load current circuit between three neutral outlets of the complex load 5 and "earth."

Figure 8:
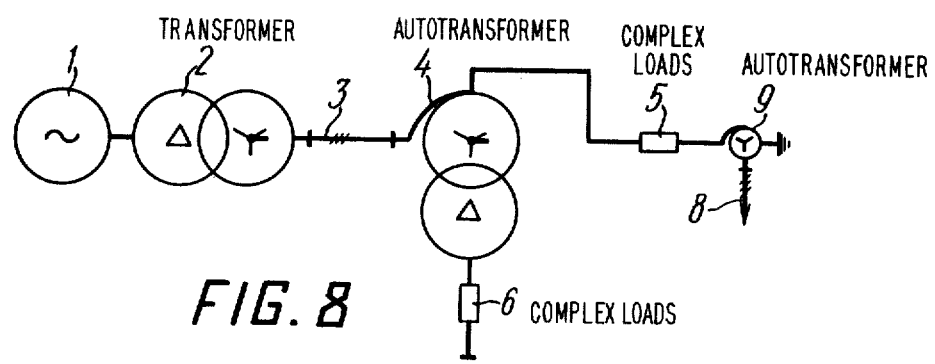
FIG. 8 shows a high-voltage network for areas with high rate of icing, wherein the primary winding of an autotransformer for melting of ice coating is inserted between three neutral outlets of the complex load and "earth," according to the invention.

In the high-voltage network of FIG. 8, the primary winding of the autotransformers 9 for melting of ice coating is connected in series with the load current circuit between three neutral outlets of the complex load 5 and "earth."

Figure 9:
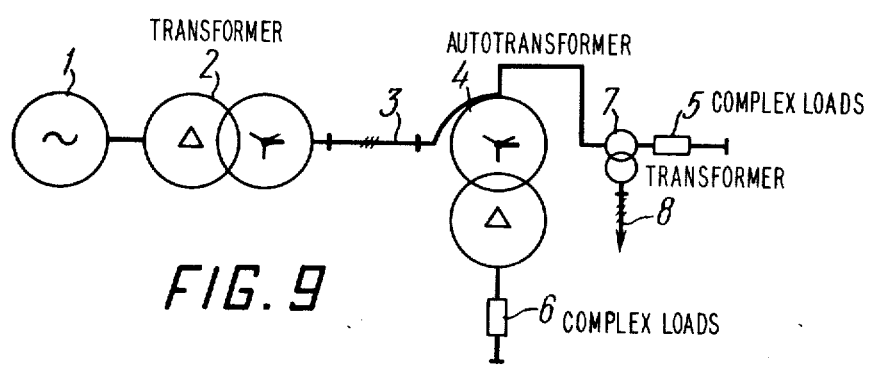
FIG. 9 shows a high-voltage network for areas with high rate of icing, wherein the primary winding of a transformer for melting of ice coating is inserted between the complex load and the outlets of the average-voltage winding of an autotransformer, according to the invention.

FIG. 9 shows a high-voltage network for areas with high rate of icing similar to that of FIG. 1, wherein the primary winding of the transformer 7 for melting of ice coating is connected in series with the load current circuit between the outlets of the average-voltage winding of the autotransformer 4 and the complex load 5.

The primary winding of the autotransformer for melting of ice coating is also connected similarly in series with the load current circuit between the outlets of the average-voltage winding of the autotransformer and the complex load.

Figure 10:
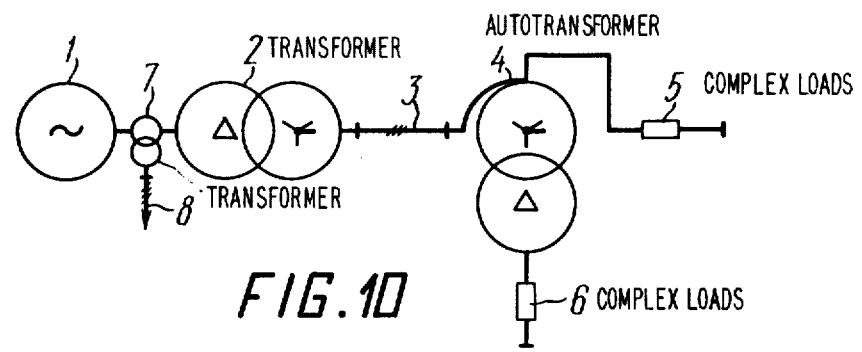
FIG. 10 shows a high-voltage network for areas with high rate of icing, wherein the primary winding of a transformer for melting of ice coating is inserted between outlets of a generator and those of the low-voltage winding of the transformer, according to the invention.

FIG. 10 shows a high-voltage network for areas with high rate of icing similar to that of FIG. 1, wherein the primary winding of the transformer 7 for melting of ice coating is connected in series with the load current circuit between the outlets of the generator 1 and those of the low-voltage winding of the transformer 2.

Figure 11:
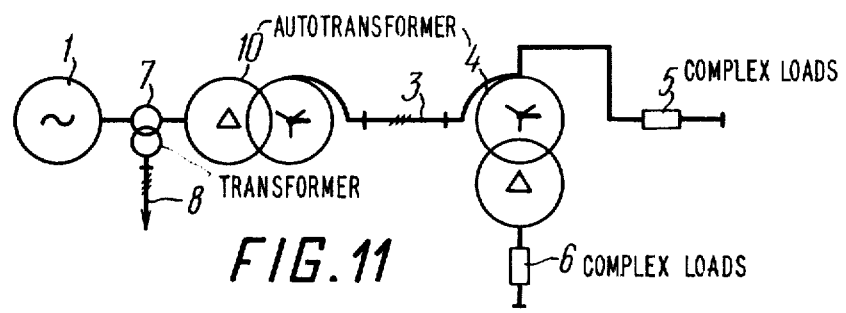
FIG. 11 shows a high-voltage network for areas with high rate of icing, wherein the primary winding of a transformer for melting ice coating is inserted between the outlets of a generator and those of the low-voltage winding of an autotransformer according to the invention.

The primary winding of the transformer 7 (FIG. 11) for melting of ice coating is connected similarly in series with the load current circuit between the outlets of the generator 1 and the outlets of the low-voltage winding of the autotransformer 10.

FIG. 12 shows an embodiment of a high-voltage network for areas with high-rate of icing, intended for melting of ice coating by the use of direct current on conductors of an aerial electric power transmission line 8, its conductors being removed from service. This being the case, a high-voltage rectifier 11, drawing current from the secondary winding of the transformer 7 for melting of ice coating is connected via disconnectors 12 to bars 13, from which the aerial power transmission line 8, which is connected to the bars 13 via the disconnectors 14, takes its current. At the opposite end the aerial line 8 is connected via disconnectors 15 to a grounding circuit. The primary winding of the transformer 7 for melting of ice coating is connected with a load current circuit between three neutral outputs of the average-voltage winding of the reducing autotransformer 4 of the high-voltage network and "earth." The autotransformer 4 is connected to feed bars 16 via a switch 17. Feed bars 20 and 21 are connected to the average-voltage and to the low-voltage windings of the autotransformers 4 via switches 18 and 19 respectively.

A shunting switch 22 is connected in parallel to the primary winding of the transformer 7 for melting of ice coating. Additionally there is provided an arc short-circuiter 23, three electrodes of which are connected to the alternating current inlets of the rectifier 11 (not shown in the FIG.), and two electrodes of which are connected to direct current outlets 24 of said rectifier 11, a higher harmonic filter being connected to said outlets, said filter being embodied as a recurrent network which includes a condenser 25 and an inductor 26 connected in series.

FIG. 13 shows a high-voltage network for areas with high rate of icing similar to that of FIG. 12. This network is peculiar in that the circuit which includes the series connected condenser 25 and the inductor 26, is connected in parallel with the secondary winding of the transformer 7 for melting of ice coating.

FIG. 14 shows a high-voltage network for areas with high rate of icing similar to that of FIG. 12. A distinguishing characteristic of the network is in that the recurrent network, which includes the series connected condenser 25 and the inductor 26, is connected in parallel with the primary winding of the transformer 7 for melting of ice coating.

FIGS. 15, 16 and 17 show high-voltage networks for areas with high rate of icing analogous to those of FIGS. 12, 13 and 14 respectively. The main distinguishing features thereof is the use of the autotransformer 9 as the transformer for melting of ice coating.

FIG. 18 shows an embodiment of a high-voltage network for areas with high rate of icing, wherein shunting reactors 27 of the high-voltage power transmission line are used as complex load, said reactors being connected with the generator 1 via a switch 28. The primary winding of the transformer 7 for melting of ice coating is connected in series with the load current circuit between the shunting reactor 27 and "earth" or "ground". The shunting switch 22 is mounted in parallel with the primary winding of the transformer 7 for melting of ice coating. The high-voltage rectifier 11 is connected to the secondary winding of the transformer 7 for melting of ice coatings. The higher harmonic filter is connected to the direct current outlets of the rectifier 11, said filter including the inductor 26 and the condenser 25 connected in series. The rectifier 11 is connected to bars, said connection being conventionally marked by arrows in the drawing, which bars feed power to the aerial power transmission line short circuited at the opposite end in the manner of the embodiment of FIG. 12.

FIG. 19 shows an embodiment of a high-voltage network for areas with high rate of icing similar to that of FIG. 18. The main distinguishing features is the use of conductors of a short-circuited aerial power transmission line 29 as a complex load. The secondary winding of the transformer 7 for melting of ice coating is connected to conductors of aerial power transmission line short-circuited at the opposite end, which connection is conventionally marked in the drawing with an arrow.

FIG. 20 shows a high-voltage network for areas with high rate of icing, wherein the aerial power transmission line, from the conductors of which an ice coating must be removed, comprises two insulated groups of conductors 30, which are equipotential as per working voltages thereof, borne in mind are circular and double-circuit aerial power transmission lines, as well as a split phase aerial power transmission line. The network may include several such aerial power transmission lines. The insulated groups 30 of conductors are connected via a switch 31 with disconnectors 32 to bars 33 of a power supply substation. The secondary winding of a single-phase autotransformer 34 for melting of an ice coating is split into two sections 35, which together with the two insulated groups 30 of conductors are switched into a circuit, said sections 35 of the secondary winding of the autotransformers 34 for melting of ice coating being switched into said circuit accordantly.

The sections 35 are connected to the insulated groups 30 of conductors via disconnectors 36, whereas the primary winding of the single-phase transformer 34 for melting of ice coating is switched into the load current circuit in series between an outlet of the high-voltage winding of the autotransformer 4 and insulated groups 30 of conductors. The primary winding of the autotransformer 34 for melting of ice coating is connected to bars 37 of the substation via disconnectors 38 and 39, a switch 40 and one more disconnector 39. The autotransformer 34 for melting of ice coating, together with the disconnectors 36 and 38 is shunted by means of switches 41.

The drawings shows also the generator 1 connected to the bars 33.

FIG. 21 shows a high-voltage network for areas with high rate of icing similar to that of FIG. 20. It is peculiar in that it is provided with only one insulated group of conductors comprising three conductors 42, said group 30 of conductors and a conductor being equipotential as per working voltage thereof.

In a high-voltage network for areas with high rate of icing of FIG. 22 each phase 43 of the aerial power transmission line connected to bars 44 of a power supply substation comprises three insulated conductors 45. A network may comprise several of such aerial power transmission lines. A primary winding 46 of a three-phase three-winding transformer for melting of ice coating is switched in series into a load current circuit between three neutral outputs of the average-voltage winding of the autotransformer 4 and "earth" said autotransformer being connected to bars 47.

Each phase of the secondary winding 48 of a three-phase three-winding transformer for melting of ice coating is connected in series respectively to one of the three insulated conductors 45 or the phase 43 of the aerial power transmission line and to the bars 47. A tertiary winding 49 of the transformer for melting of ice coating is delta-connected. A shunting switch 22 is connected in parallel with the primary winding 46 of the transformer for melting of the ice coating. Each phase of the secondary winding 48 of the transformer for melting of the ice coating is shunted with a switch 50. The drawing also shows the generator 1 connected to the bars 44.

FIG. 23 shows a high-voltage network for areas with high rate of icing comprising an aerial power transmission line including four insulated conductors 51 in phase 52. The aerial power transmission line is connected to bars 53 of the power supply substation via a switch 54 provided with disconnectors 55 and to bars 56 of the receiving substation via a switch 57 with disconnectors 58. One of the autotransformers 4 of the high-voltage transmission line is connected to bars 53 via a switch 59 with disconnectors 60. Another autotransformer 4 is connected to bars 56 via a switch 61 with disconnectors 62. The power supply and the receiving substations are provided with two three-phase transformers 7 for melting of an ice coating, which transformers are switched into the aerial power transmission line from the opposite ends thereof. The primary windings of the transformers 7 for melting of an ice coating are switched in series into the load current circuits between three neutral bushings of the autotransformers 4 and "earth" or "ground". The unlike pairs of insulated conductors 51 in phase 52 are coupled from the opposite ends of the aerial power transmission line. These pairs are connected with like phases of the secondary windings of the transformers 7 for melting of the ice coating. The remaining two phases of each of the transformers 7 for melting of the ice coating are connected to the remaining non-connected insulated conductors 51. Disconnectors 63 connect the insulated conductors 51 of the aerial line with bars 64, which bars are connected with the secondary windings of the transformers 7 for melting of the ice coating. At the receiving and the transmitting ends of the aerial power transmission line there are provided disconnectors 65 and 66, respectively. Shunting switches 22 with disconnectors 67 are mounted in parallel with the primary windings of the transformers 7 for melting of the ice coating.

The drawing also shows the generators 1 connected to the bars 53 and 56.

FIG. 24 shows a high-voltage network for areas with high rate of icing similar to that of FIG. 23. The distinguishing feature of the network is in that the autotransformers 9 are used in the network as transformers for melting of an ice coating.

FIG. 25 shows a high-voltage network for areas with high rate of icing similar to that of FIG. 20, the aerial power transmission line including two equipotential insulated groups 30 of conductors as per the working voltages thereof. Single-phase converters 68 are connected accordantly in series with each of the insulated groups 30 of conductors of the aerial power transmission line, which converters 68 are fed from a split secondary winding 69 of a transformer 70 for melting of ice coating. The converters 68 are built around a rectifier 71 arranged in a single-phase bridge circuit. A higher harmonic filter and two of the three electrodes of a discharger 72 are between the insulated groups 30 of the conductors of the aerial power transmission line, said filter being a recurrent network which includes a condenser 25 and an inductor 26 connected in series. The third electrode of the discharger 72 is connected to a common point 73 of connection of the unlike poles of the converters 68, which point is connected also with the primary winding 74 of the transformer 70 for melting of ice coatings, the winding being connected to the bars 37 via the circuit breaker 40 with the disconnectors 39. The single-phase converters 68, the transformer 70 for melting of ice coatings, and also the higher harmonic filter and the discharger 72 are shunted with the switch 41.

The process of melting of ice coatings on conductors of aerial power transmission lines of the high-voltage network for areas with high rates of icing, shown in FIG. 1, is as follows: The aerial power transmission line 8 on which the ice coating is to be melted, is connected directly to the secondary winding of the transformer 7 for melting of the ice coating and is short-circuited at the opposite end thereof. The current passing through the conductors of the aerial power transmission line 8 heats said conductors resulting in melting of the ice coating on the conductors and in removal of the ice therefrom.

Owing to the fact that the capacity transmitted through the load current circuit exceeds the power consumed for melting the ice coating on the conductors of the aerial power transmission line 8 by one order of magnitude, the change of voltage in the load current circuit may be ignored. Now the operating conditions of the transformer 7 for melting of ice coatings are close to those of the current source. The maximum value of the voltage at which the ice coatings on the conductors of the aerial power transmission line 8 melt and, consequently, the maximum length of the warmed up aerial power transmission line 8, are limited by saturation of the magnetic circuit of the transformer 7 for melting of ice coatings.

It is important, that short-circuits in the warmed up aerial power transmission line do not result in overcurrents, but in reduction of voltage applied to the primary winding of the transformer 7 for melting of ice coatings. This feature makes it possible to place less stringent requirements upon equipment of the high-voltage network.

The above-described features are also applicable to the embodiments of the high-voltage networks of FIGS. 2 - 11.

To reduce the power consumed while melting ice coatings, it is advisable to connect the secondary winding of the transformer 7 (FIG. 12) for melting of ice coatings to the aerial power transmission line 8 via the rectifier 11. In this case melting the ice coating is effected on disconnected conductors of the aerial power transmission line 8.

The described procedure of melting of ice coatings on the conductors of the aerial power transmission line 8 with rectified current incorporates distinguishing features, the nature of which is in that an alternating current flowing from the side of the inlets of the rectifier 11 is of a strictly preset form. Unless special measures are provided, such feature results in pulsation in the rectified current of the converter 11, practically irrespective of parameters of the circuit in which the current for melting of ice coating is flowing, said feature, in its turn, resulting in overvoltage across elements of the converter 11.

With a view to eliminating dangerous overvoltages across elements of the converter 11, there is provided a higher harmonic filter embodied as a recurrent network comprising a condenser 25 and an inductor 26 connected in series.

With the aim of limiting overcharges occurring at emergency conditions of operation down to permissible values, there is provided an arc short-circuiter 23.

The transformer 7 for the melting of ice coatings is brought into operation and removed from operation by the use of a shunting switch 22. As the ice coating is being melted, the shunting switch 22 is disconnected, while disconnectors 12, 14, 15 and a switch 17 are switched on.

The currents of the common part of the windings of the autotransformer 4 prior to start of the process of melting were bridged through the shunting switch 22. After the switch 22 is in off position, the load current of the common part of the windings of the auto transformer 4 is bridged through the primary winding of the transformer 7 for melting the ice coating. The presence of load current in the primary winding of the transformer 7 for melting of ice coatings causes generation of currents in the secondary winding, the difference in value between the secondary and the primary currents being equal to the ratio of transformation of the transformer 7 for melting of ice coatings. The secondary currents, being rectified by the use of the converter 11, are closed in a circuit formed by the rectifier 11, by the conductors of the aerial power transmission line 8 and "earth" or "ground". "Earth" can be additionally employed to obtain the return of direct current. The process of melting in the embodiments of a high-voltage network shown in FIGS. 13 - 17 is similar to that described above.

FIG. 18 shows an embodiment of a high-voltage network for areas with high rates of icing, wherein a shunting reactor 27 or high voltage transmission line is used as a complex load. The bringing of the transformer 7 for melting of ice coatings into operation and removal of the transformer from operation are provided by the use of the shunting switch 22, similarly to abovedescribed case.

FIG. 19 shows an embodiment of a high-voltage network for areas with high rates of icing similar to the above described network wherein conductors of the short-circuited aerial power transmission line 29 are used as a complex load.

While melting the ice coating without disconnecting the aerial power transmission line, for example, by the use of the analogous phases of double-circuit, circular aerial power transmission lines or by insulating separate conductors of a split phase, like in the given case, it is advisable to connect the primary winding of an autotransformer 34 (FIG. 20) for melting of ice coatings in series with the insulated groups 30 of the conductors of the aerial power transmission line and with the outlets of the high-voltage winding of the autotransformer 4. The connection of the secondary windings 35 of the autotransformer 34 for melting of ice coatings to the insulated groups 30 of conductors is provided by the use of the disconnectors 36. The insulated groups 30 of conductors are connected to the bars 33 of a power supply substation via the switch 31 with the disconnectors 32 and to the bars 37 of a receiving substation via the switch 40 with the disconnectors 39. The autotransformer 34 for melting of ice coatings is brought into action by cutting off or shunting the switches 41. The switching of the primary winding of the autotransformer 34 for melting of ice coatings into the load current circuit is provided by the use of the disconnector 38.

For simplicity, with aerial power transmission lines having three conductors 42 (FIG. 21) in phase, it is advisable to insulate only one of the three conductors 42 of the aerial power transmission line. This being the case, the current may be increased in modulus threefold simultaneously in all the three conductors 42. The current-distribution between the conductors 42 and the windings of the autotransformer 34 for melting of ice coating is shown in FIG. 21 by arrows "J" - current.

With the aim of balancing out the assymetry under operating conditions of melting of ice coatings when three insulated conductors 45 (FIG. 22) of the phase 43 are available, as well as to increase the current for melting of ice coatings more than threefold as compared to that of rated operating conditions, the three-phase secondary winding 48 of a three-phase, three-winding transformer for melting of ice coatings is connected in series with three insulated conductors 45 of the phase 43 of the aerial power transmission line, and the neutral outlet of the winding 48 is connected with the bushing of the autotransformer 4. The transformer for melting of ice coatings is brought into operation by cutting off the shunting switches 22 and 50. The tertiary winding 49 of the transformer for melting of ice coatings, delta-connected, serves to bridge currents of third harmonic.

With four insulated conductors 51 (FIG. 23, 24) in the phase 52 of the aerial power transmission line, an equal current can be developed in each of them. However, it should be pointed out, that equality of currents in all the four conductors 51 of the aerial power transmission line is achieved at the expence of certain assymetry of the power supply. Prior to the beginning of the process of melting of ice coatings the switches 54 and 57 with the disconnectors 55 and 58 are closed. The neutral wires of the autotransformers 4 are earthed or grounded by the use of switches 22 with the disconnectors 63. The disconnectors 67 are cut off. The disconnectors 65 and 66 are switched in prior to the beginning of the process of melting of ice coatings. The switches 59 and 61 with the disconnectors 60 and 62 are closed. While melting the ice coatings, the switches 54 and 57 are switched off and the circuits thereof taken apart. After that, the disconnectors 65 and 66 at the receiving and transmitting ends of the aerial power transmission line are cut off. The disconnectors 63 are switched on. The switches 54 and 57 being switched off, there are two equivalent load current circuits existing in the receiving and the transmitting systems. The load current circuits of the transmitting and receiving systems are formed by the generators 1, the bars 53 and 56, the switches 59 and 61, the autotransformers 4 and the load. The currents of the common portion of the windings of the autotransformers 4 prior to the start of process of melting of ice coatings were bridged through the shunting switches 22. After the shunting switches 22 are switched off both from the receiving substation and from the transmitting substation, the load current of the common portion of the winding of the autotransformer 4 will be bridged through the primary winding of the transformer 7 for melting of ice coatings. The current sets up magnetizing ampere-turns, which causes their associated magnetic flux in the magnetic circuit of the transformer 7 for melting of ice coatings. Under the effect of electromotive force of the secondary winding, an electric current starts flowing through the insulated conductors 51 of the phase 52 of the aerial power transmission line.

To reduce the power consumed for melting of ice coatings, the single-phase converters 68 (FIG. 25) are used even in case the aerial power transmission lines are in operation. With the aim of eliminating diversion of current through dead earthed or grounded neutral wires and in series with each of the insulated groups 30 of conductors of the aerial power transmission line, there are accordantly connected the single-phase converters 68, which are fed from the secondary winding 69 of the transformer 70 for melting of ice coatings. Prior to the start of melting of ice coatings the switches 41 are closed. The switches 31 and 40 with the disconnectors 32 and 39 are also closed.

For melting ice coating the shunting switches 41 are switched open resulting in setting up load current in the primary winding 74 of the transformer 70 for melting of ice coatings. The load current generated in the primary winding 74 causes setting up currents in the split secondary winding 69, its currents being different from those in the primary winding by the coefficient of transformation of the transformer 70 for melting of ice coatings.

The secondary currents, being rectified by the converters 68, are closed in a circuit formed by the converter 68 and the insulated groups 30 of conductors. Since load current is generated in conductors of the insulated groups 30 besides melting current, the form of electric current in the secondary winding 69 of the transformer 70 for melting of ice coating is distorted, resulting in setting up of constant component point in each section of the split secondary winding 69. The availability in different sections of the secondary winding 69 of constant components, which are equal in modulus but opposite in sign results in practically full compensation of the magnetizing ampere turns and, in consequence, results in absence of constant component in the magnetic flux of the magnetic circuit of the transformer 70 for melting of ice coatings. The whole alternating component of the rectified current is bridged through the higher harmonic filter. With the aim of bringing overvoltages occurring under emergency operating conditions down to permissable values, there is provided the arc short-circuiter 72. Each of the converters 68 is protected therewith by one of the electrode couples of the three-electrode are short-circuiter 72.

The present invention provides for reducing the time required for warming up conductors of aerial power transmission lines, on which melting of ice coatings is carried out and for reducing emergency overcurrents in elements of a high-voltage network for areas with high rates of icing.

What is claimed is:

1. A high-voltage network for areas with high rates of icing comprising: load current circuits including a generator, a first transformer, aerial power transmission lines and complex loads; a second transformer for melting of ice coatings with its primary winding being connected in series with a load current circuit and the secondary winding of said second transformer being connected to conductors of one of said aerial power transmission lines.

2. A high-voltage network as claimed in claim 1, wherein said secondary winding of said second transformer for melting of ice coatings is connected to conductors of one of said aerial power transmission lines via a rectifier, a recurrent network comprising an inductor and a condenser connected in series being coupled to direct current outlets of said rectifier.

3. A high-voltage network as claimed in claim 1, wherein said secondary winding of said second transformer for melting of ice coatings is connected to conductors of one of said aerial power transmission lines via a rectifier, a recurrent network comprising an inductor and a condenser connected in series being coupled in parallel with said secondary winding.

4. A high-voltage network as claimed in claim 1, wherein said secondary winding of said second transformer for melting of ice coatings is connected to conductors of one of said aerial power transmission lines via a rectifier, a recurrent network comprising an inductor and a condenser connected in series being coupled in parallel to said primary winding of said second transformer for melting of ice coatings.

5. A high-voltage network for areas with high rates of icing, comprising: load current circuits including a generator, an autotransformer, aerial power transmission lines and complex loads; a transformer for melting of ice coatings the primary winding of which is connected in series with a load current circuit, whereas the secondary winding of said transformer is connected to conductors of one of said aerial power transmission lines.

6. A high-voltage network as claimed in claim 5, wherein said secondary winding of said transformer for melting of ice coatings is connected to conductors of one of said aerial power transmission lines via a rectifier, a recurrent network comprising an inductor and a condenser connected in series being coupled to direct current outlets of said rectifier.

7. A high-voltage network as claimed in claim 5, wherein said secondary winding of said transformer for melting of ice coatings is connected to conductors of one of said aerial power transmission lines via a rectifier, a recurrent network comprising an inductor and a condenser connected in series being coupled in parallel with said secondary winding.

8. A high voltage network as claimed in claim 5, wherein said secondary winding of said transformer for melting of ice coatings is connected to conductors of one of said aerial power transmission lines via a rectifier, a recurrent network comprising an inductor and a condenser connected in series being coupled in parallel to said primary winding of said transformer for melting of ice coating.

9. A high-voltage network for areas with high rates of icing comprising: load current circuits including a generator, a transformer, aerial power transmission lines and complex loads; an autotransformer for melting of ice coatings with its primary winding being connected in series with a load current circuit, whereas the secondary winding of said autotransformer is connected to conductors of one of said aerial power transmission lines.

10. A high-voltage network as claimed in claim 9, wherein said secondary winding of said autotransformer for melting of ice coatings is connected to conductors of one of said aerial power transmission lines via a rectifier, a recurrent network comprising an inductor and a condenser connected in series being coupled to direct current outlets of said rectifier.

11. A high-voltage network as claimed in claim 9, wherein said secondary winding of said autotransformer for melting of ice coatings is connected to conductors of one of said aerial power transmission lines via a rectifier, a recurrent network comprising an inductor and a condenser connected in series being connected in parallel with said secondary winding.

12. A high-voltage network as claimed in claim 9, wherein said secondary winding of said autotransformer for melting of ice coating is connected to conductors of one of said aerial power transmission lines via a rectifier, a recurrent network comprising an inductor and a condenser connected in series being coupled in parallel with said primary winding of said autotransformer for melting of ice coatings.

13. A high-voltage network for areas with high rates of icing comprising: load current circuits including a generator, a first autotransformer, aerial power transmission lines and complex loads; a second autotransformer for melting of ice coatings with its primary winding being connected in series with a load current circuit, whereas the secondary winding is connected to conductors of one of said aerial power transmission lines.

14. A high-voltage network as claimed in claim 13, wherein said secondary winding of said second autotransformer for melting of ice coatings is connected to conductors of one of said aerial power transmission lines via a rectifier, a recurrent network comprising a series connected inductor and a condenser being coupled to direct current outlets of said rectifier.

15. A high-voltage network as claimed in claim 13, wherein said secondary winding of said second autotransformer for melting of ice coatings is connected to conductors of one of said aerial power transmission lines via a rectifier, a recurrent network comprising an inductor and a condenser connected in series being coupled in parallel with said secondary winding.

16. A high-voltage network as claimed in claim 13, wherein said secondary winding of said autotransformer for melting of ice coatings is connected to conductors of one of said aerial power transmission lines via a rectifier, a recurrent network comprising an inductor and a condenser connected in series, being coupled in parallel with said primary winding of said second autotransformer for melting of ice coatings.

17. A high-voltage network for areas with high rates of icing comprising: load current circuits including a generator, a first transformer, aerial power transmission lines and complex loads; a second transformer for melting of ice coatings with its primary winding being connected in series with a load current circuit between outlets of said generator and those of a low-voltage winding of said first transformer, whereas the secondary winding of said second transformer for melting of ice coatings is connected to conductors of one of said aerial power transmission lines.

18. A high-voltage network for areas with high rates of icing comprising: load current circuits including a generator, an autotransformer, aerial power transmission lines and complex loads; a transformer for melting of ice coatings with its primary winding being connected in series with a load current circuit between outlets of said generator and those of a low-voltage winding of said autotransformer, whereas the secondary winding of said transformer is connected to conductors of one of said aerial power transmission lines.

19. A high-voltage network for areas with high rates of icing comprising: load current circuits including a generator, a first transformer, aerial power transmission lines and complex loads; a second transformer for melting of ice coatings with its primary winding being connected in series with a load current circuit between "earth" and three neutral outlets of a high-voltage winding of said first transformer, whereas the secondary winding of said second transformer for melting of ice coatings is connected to conductors of one of said aerial power transmission lines.

20. A high-voltage network for areas with high rates of icing comprising: load current circuits including a generator, an autotransformer, aerial power transmission lines and complex loads; a transformer for melting of ice coatings with its primary winding being connected in series with a load current circuit between "earth" and three neutral outlets of a high-voltage winding of said autotransformer, whereas the secondary winding of said transformer is connected to conductors of one of said aerial power transmission lines.

21. A high-voltage network for areas with high rates of icing comprising: load current circuits including a generator, a transformer, aerial power transmission lines and complex loads; an autotransformer for melting of ice coatings with its primary winding being connected in series with a load current circuit between "earth" and three neutral outlets of a high-voltage winding of said transformer, whereas the secondary winding of said autotransformer is connected to conductors of one of said power transmission lines.

22. A high-voltage network for areas with high rates of icing comprising: load current circuits including a generator, a first autotransformer, aerial power transmission lines and complex loads; a second autotransformer for melting of ice coatings with its primary winding being connected in series with a load current circuit between "earth" and three neutral outlets of a high-voltage winding of said first autotransformer, whereas the secondary winding of said second autotransformer is connected to conductors of one of said aerial power transmission lines.

23. A high-voltage network for areas with high rates of icing comprising: load current circuits including a generator, a first transformer, aerial power transmission lines and complex loads; a second transformer for melting of ice coatings with its primary winding being connected in series with a load current circuit between a high-voltage bushing of said first transformer and the phase of an aerial power transmission line, whereas the secondary winding of said second transformer is connected to conductors of another aerial power transmission lines.

24. A high-voltage network for areas with high rates of icing comprising: load current circuits including a generator, an autotransformer, aerial power transmission lines and complex loads; a transformer for melting of ice coatings with its primary winding being connected in series with a load current circuit between a high-voltage bushing of said autotransformer and the phase of one aerial power transmission line, whereas the secondary winding thereof is connected to conductors of another of said power transmission lines.

25. A high-voltage network for areas with high rates of icing comprising: load current circuits including a generator, a transformer, aerial power transmission lines and complex loads; an autotransformer for melting of ice coatings with its primary winding being connected in series with a load current circuit between a high-voltage bushing of said transformer and the phase of an aerial power transmission line, whereas the secondary winding of said autotransformer is connected to conductors of another of said aerial power transmission lines.

26. A high-voltage network for areas with high rates of icing comprising: load current circuits including a generator, a first autotransformer, aerial power transmission lines and complex loads; a second autotransformer for melting of ice coatings with its primary winding being connected in series with a load current circuit between a high-voltage bushing of said first autotransformer and the phase of an aerial power transmission line, whereas the secondary winding of said second autotransformer is connected to another of said aerial power transmission lines.

27. A high-voltage network for areas with high rates of icing comprising: load current circuits including aerial power transmission lines and complex loads; a transformer for melting of ice coatings with its primary winding being connected in series with a load current circuit between three neutral outlets of a complex load and "earth," whereas the secondary winding of said transformer is connected to conductors of one of said aerial power transmission lines.

28. A high-voltage network for areas with high rates of icing comprising: load current circuits including aerial power transmission lines and complex loads; an autotransformer for melting of ice coatings with its primary winding being connected in series with a load current circuit between three neutral outlets of a complex load and "earth," whereas the secondary winding of said autotransformer is connected to conductors of one of said aerial power transmission lines.

29. A high-voltage network for areas with high rates of icing comprising: load current circuits including a generator, an autotransformer, aerial power transmission lines and complex loads; a transformer for melting of ice coatings with its primary winding being connected in series with a load current circuit between a complex load and outlets of an average-voltage winding of said autotransformer, whereas the secondary winding of said transformer is connected to one of said aerial power transmission lines.

30. A high-voltage network for areas with high rates of icing comprising: load current circuits including a generator, a first autotransformer, aerial power transmission lines and complex loads; a second autotransformer for melting of ice coatings with its primary winding being connected in series with a load current circuit between a complex load and outlets of an average-voltage winding of said first autotransformer, whereas the secondary winding of said second autotransformer is connected to conductors of one of said aerial power transmission lines.

31. A high-voltage network for areas with high rates of icing comprising: load current circuits including aerial power transmission lines, at least one of said lines comprising two insulated groups of conductors, which are equipotential in working voltage thereof, and a single-phase autotransformer for melting of ice coatings with its primary winding being connected in series with a load current circuit, whereas the secondary winding of said autotransformer is split into two sections, which sections together with said two insulated groups of conductors are switched into a circuit, said sections of said secondary winding being switched into said circuit accordantly.

32. A high-voltage network for areas with rates of icing comprising: load current circuits including aerial power transmission lines, at least one of said lines having an insulated group of conductors comprising two conductors, and a conductor, which are equipotential in working voltage thereof; a single-phase autotransformer for melting of ice coatings with its primary winding being connected in series with a load current circuit, whereas the secondary winding thereof is split into two sections, which sections together with said insulated group of conductors and said conductor are switched into a circuit, said sections of the secondary winding being switched into said circuit accordantly.

33. A high-voltage network for areas with high rates of icing comprising: load current circuits including aerial power transmission lines, at least one of said lines comprising three insulated conductors in phase, and a three-phase transformer for melting of ice coatings with its primary winding being connected in series with a load current circuit, whereas each phase of the secondary winding of said transformer is connected in series respectively with one of said insulated conductors of the phase of an aerial power transmission line.

34. A high-voltage network for areas with high rates of icing comprising: load current circuits including aerial power transmission lines, at least one of said lines comprising four insulated conductors in phase, two unlike pairs of insulated conductors of the line being short-circuited from the opposite ends thereof, and two three-phase transformers for melting of ice coatings with the primary windings of said transformers being connected in series with said load current circuits, whereas the secondary windings of said transformers are connected to said aerial power transmission lines from the opposite ends thereof, line phases of the secondary windings of both said transformers for melting of ice coatings being connected therewith to unlike said pairs of the short-circuited insulated conductors, whereas two remaining phases of said transformers for melting of ice coatings are connected to two remaining insulated conductors.

35. A high-voltage network for areas with high rates of icing comprising: load current circuits including aerial power transmission lines, at least one of which comprises four insulated conductors in phase, two unlike pairs of said insulated conductors being short-circuited from the opposite ends thereof, and two three-phase autotransformers for melting of ice coatings with the primary windings of said autotransformers being connected in series with said load current circuits, whereas the secondary windings of said autotransformers are connected to said aerial power transmission lines, the connection being made from the opposite ends of the line, the like phases of said secondary windings of both said autotransformers for melting of ice coatings being connected to unlike said pairs of the short-circuited insulated conductors, whereas two remaining phases of said autotransformers for melting of ice coatings are connected to two remaining said insulated conductors.

36. A high-voltage network for areas with high rates of icing comprising: load current circuits including aerial power transmission lines, at least one of which comprises two insulated groups of conductors, which are equipotential in working voltage; a transformer for melting of ice coatings with its primary winding being connected in series with a load current circuit; single-phase converters fed from the secondary winding of said transformer for melting of ice coatings and which converters together with said two insulated groups of conductors are connected in series into a circuit, said single-phase converters being connected into said circuit accordantly.

* * * * *